(12) United States Patent
Bankston et al.

(10) Patent No.: US 11,757,638 B2
(45) Date of Patent: Sep. 12, 2023

(54) ACCOUNT ASSERTION

(71) Applicant: Visa International Service Association, San Francisco, CA (US)

(72) Inventors: Michael Steven Bankston, Oakland, CA (US); Erik Friend, Mountain View, CA (US); Jerry Wald, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 192 days.

(21) Appl. No.: 17/289,405

(22) PCT Filed: May 13, 2019

(86) PCT No.: PCT/US2019/031996
§ 371 (c)(1),
(2) Date: Apr. 28, 2021

(87) PCT Pub. No.: WO2020/091841
PCT Pub. Date: May 7, 2020

(65) Prior Publication Data
US 2021/0399892 A1    Dec. 23, 2021

Related U.S. Application Data

(60) Provisional application No. 62/752,586, filed on Oct. 30, 2018.

(51) Int. Cl.
*H04L 9/32* (2006.01)
*H04L 9/08* (2006.01)

(52) U.S. Cl.
CPC .......... *H04L 9/3213* (2013.01); *H04L 9/0825* (2013.01); *H04L 9/3242* (2013.01)

(58) Field of Classification Search
CPC ... H04L 9/3213; H04L 9/0825; H04L 9/3242; H04L 63/0815; H04L 67/02;
(Continued)

(56) References Cited

U.S. PATENT DOCUMENTS 8,380,177 B2 *   2/2013   Laracey ............. G06Q 30/0253
                                                   455/414.1
9,848,052 B2 *  12/2017   Kumnick ................ H04L 67/53
(Continued)

FOREIGN PATENT DOCUMENTS

CN          102870132 A        1/2013
CN          104182868 A       12/2014
(Continued)

OTHER PUBLICATIONS

CN201980072238.6, "Office Action", dated Oct. 14, 2022, 20 pages.
(Continued)

*Primary Examiner* — Teshome Hailu
*Assistant Examiner* — Yohannes Wallelign Minwuyelet
(74) *Attorney, Agent, or Firm* — Kilpatrick Townsend & Stockton LLP

(57) ABSTRACT

Methods and systems for processing interactions with account assertions are disclosed. A method includes receiving, by an assertions model manager, a first request from a resource provider computer for a set of assertions including an account assertion, related to a digital identity of a user. The method then includes responding, by the assertions model manager, to the first request with a response message, comprising a set of assertions, wherein one of the plurality of assertions is an account assertion. Then the method includes receiving, by the assertions model manager, a second request from the resource provider for a value
(Continued)

interaction from the user and initiating, by the assertions model manager, the value interaction.

20 Claims, 5 Drawing Sheets

(58) Field of Classification Search
CPC .............. H04L 67/306; G06Q 20/4014; G06Q 20/405; G06Q 30/06; G06F 21/335
See application file for complete search history.

(56) References Cited

U.S. PATENT DOCUMENTS

| | | |
|---|---|---|
| 2012/0078791 A1 | 3/2012 | Huang et al. |
| 2013/0036089 A1 | 2/2013 | Lucas |
| 2013/0246272 A1* | 9/2013 | Kirsch ................ G06Q 20/401 705/44 |
| 2014/0020073 A1 | 1/2014 | Ronda et al. |
| 2014/0173754 A1 | 6/2014 | Barbir |
| 2014/0372308 A1 | 12/2014 | Sheets |
| 2018/0198876 A1* | 7/2018 | Ma ......................... G06Q 30/02 |
| 2018/0285915 A1 | 10/2018 | Sharma et al. |
| 2019/0188694 A1* | 6/2019 | Uppalapati ............ G06Q 20/12 |
| 2019/0349360 A1* | 11/2019 | Yeddula .............. H04L 63/0807 |

FOREIGN PATENT DOCUMENTS

| | | |
|---|---|---|
| CN | 105960776 A | 9/2016 |
| CN | 107851254 A | 3/2018 |
| WO | 2014008579 A1 | 1/2014 |

OTHER PUBLICATIONS

PCT/US2019/031996, "International Search Report and Written Opinion", dated Aug. 19, 2019, 10 pages.

SG11202104169Y, "Written Opinion", dated Nov. 28, 2022, 8 pages.

* cited by examiner

ACCOUNT ASSERTION

CROSS-REFERENCES TO RELATED APPLICATIONS

This application is a National Stage of International Application No. PCT/US2019/031996, May 13, 2019, which claims the benefit of the filing date of U.S. Provisional Application No. 62/752,586, filed on Oct. 30, 2018, which are herein incorporated by reference in their entirety.

BACKGROUND

Data security, both of user information and account information, can be important in interactions between a user and resource provider. Some interactions can make use of tokens. Tokens can be hidden and encrypted, but there is still a possibility of interception. Information can be intercepted from low-security entities like a user or resource provider and misused by attackers.

A digital identity (DI) may include a secure set of information about an entity (e.g., a person, an organization, a thing). The DI may, in turn, be made available to another entity in a secure manner. In order to receive information about a DI, an entity may request an assertion, or statement of fact about the DI. Some assertions may relate to access information and/or account information about the DI.

There is a need to manage user information, particularly access and account information when a DI is used to initiate an interaction. Embodiments address these and other problems individually and collectively.

BRIEF SUMMARY

One embodiment includes receiving, by an assertions model manager, a first request from a resource provider computer for a plurality of assertions, including an account assertion, related to a digital identity of a user. The method then includes responding, by the assertions model manager, to the first request with a response message, comprising a plurality of assertions, wherein one of the plurality of assertions is an account assertion. Then the method includes receiving, by the assertions model manager, a second request from the resource provider for a value interaction from the user and initiating, by the assertions model manager, the value interaction.

Another embodiment includes an assertions model manager comprising a processor and a computer-readable medium comprising code executable by the processor to implement a method that includes receiving a first request from a resource provider computer for a plurality of assertions, including an account assertion, related to a digital identity of a user. The method then includes responding to the first request with a response message, comprising a plurality of assertions, wherein one of the plurality of assertions is an account assertion. Then the method includes receiving a second request from the resource provider for a value interaction from the user and initiating the value interaction.

Another embodiment includes receiving, by a resource provider computer, a user identifier from a user initiating an interaction with a resource provider and sending, by the resource provider computer, a first request comprising the user identifier to an assertions model manager. The method then includes receiving, by the resource provider computer from the assertions model manager, a response message comprising a plurality of assertions, wherein one of the plurality of assertions is an account assertion, and completing, by the resource provider computer, the interaction with the user. Then the method includes sending, by the resource provider computer, a second request for a value interaction to the assertions model manager and receiving, by the resource provider computer, a notification that the value interaction has been completed.

Another embodiment includes a resource provider device comprising a processor and a computer-readable medium comprising code executable by the processor to implement a method that includes receiving, by a resource provider computer, a user identifier from a user initiating an interaction with a resource provider and sending, by the resource provider computer, a first request comprising the user identifier to an assertions model manager. The method then includes receiving, by the resource provider computer from the assertions model manager, a response message comprising a plurality of assertions, wherein one of the plurality of assertions is an account assertion, and completing, by the resource provider computer, the interaction with the user. Then the method includes sending, by the resource provider computer, a second request for a value interaction to the assertions model manager and receiving, by the resource provider computer, a notification that the value interaction has been completed.

Further details regarding embodiments can be found in the Detailed Description and the Figures.

DETAILED DESCRIPTION

Figure 1:
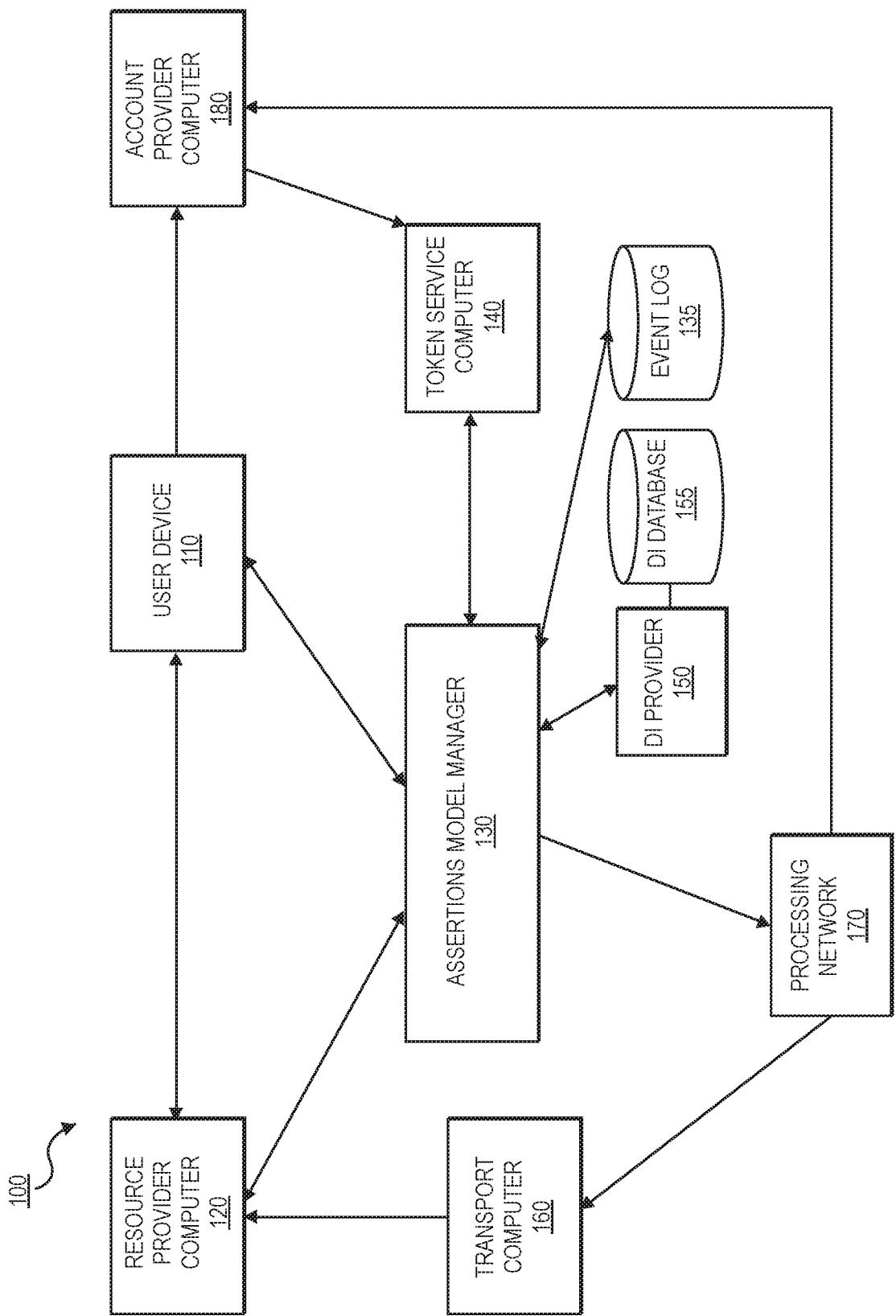
FIG. 1 shows a block diagram of a system according to embodiments.

Embodiments provide for systems and methods for generating and providing an account assertion in an interaction between a user and a resource provider. The account assertion may be based on one or more accounts of the user. The account assertion can later be used to complete a value interaction between the user and the resource provider.

An assertions model manager can generate the account assertions. The assertions model manager can protect user access data (e.g., an account number, a cryptocurrency wallet key, a PAN) by using assertions models to provide account information to resource providers without revealing sensitive account data. Account assertions may also be based on tokens of the user access data, and the tokens may be shared directly between a token service system and the assertions model manager. Thus tokens and account data can be kept out of the possession of potentially vulnerable entities like the user or a resource provider. Account assertions can additionally be based on multiple accounts of the user, from multiple account systems, including account systems that are typically not related, such as a conventional bank and a cryptocurrency exchange. The account assertions can also be used to generate a value interaction (e.g., a payment interaction, a transaction settlement).

Prior to discussing embodiments of the invention, some terms can be described in further detail.

The term "identifier" may include any indicator that may be used to identify information. In some embodiments, the identifier may be a special value generated randomly or according to a predetermined algorithm, code, or shared secret. For example, an individual may be identified using a driver's license number or a cryptographic key. In some embodiments, the identifier may be one or more graphics, a token, a bar code, a QR code, or any other information that may be used to uniquely identify an entity.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

A "value interaction" may be an interaction where value is transferred from one entity to another. Examples of value interactions may include payment and settlement interactions. Value may include currency, goods, cryptocurrency, etc.

A "user" may include an individual or a computational device. In some embodiments, a user may be associated with one or more personal accounts and/or devices. In some embodiments, the user may be a cardholder, account holder, or consumer.

A "resource provider" may be an entity that may make resources available to a user. Examples of resource providers include merchants, vendors, suppliers, owners, traders, and the like. Resource providers may be associated with one or more physical locations (e.g., supermarkets, malls, stores, etc.) and online platforms (e.g., mobile applications, e-commerce websites, online companies, etc.). In some embodiments, resource providers may make available physical items (e.g., goods, products, etc.) to the user. In other embodiments, resource providers may make available digital resources (e.g., electronic documents, electronic files, etc.) to the user. In other embodiments, resource providers may manage access to certain resources (e.g., password, code, etc.) for the user. A "resource provider computer" may include any computer associated with a resource provider. In some embodiments, the resource provider computer may handle functionality of a mobile application and/or a website associated with the resource provider from which a user may conduct an online transaction.

An "acquirer" may be a financial institution associated with a resource provider. Acquirers typically provide resource providers with a bank account, and in some cases, transaction accepting infrastructure. Generally, after a transaction has been authorized and as part of the settlement process, funds are transferred from the issuer to resource provider's account at the acquirer. The acquirer may also communicate a payment transaction status with the resource provider. The acquirer may operate an acquirer computer, which may generically be a transport computer.

An "authorizing entity" may be an entity that authorizes a request, typically using an authorizing computer to do so. An authorizing entity may be an issuer, a governmental agency, a document repository, an access administrator, etc.

An "issuer" may be a financial institution, such as a bank, that creates and maintains financial accounts for account holders. An issuer or issuing bank may issue and maintain financial accounts for users. The issuer of a particular consumer account may determine whether or not to approve or deny specific transactions. An issuer may authenticate a consumer and release funds to an acquirer if transactions are approved (e.g., a consumer's account has sufficient available balance and meets other criteria for authorization or authentication). In some embodiments, an issuer may be a publisher and may operate or be in communication with a publisher processor.

A "payment processing network" may be data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. Authorization, settlement, and clearing may be done at the same time (substantially simultaneously, e.g., within a few minutes or hours) or may be done as part of a batch settlement process (e.g., at the end of the day or week). The payment processing network may include a server computer. The payment processing network may use any suitable wired or wireless network, including the internet.

A "server computer" may be a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer-readable medium that stores instructions that can be executed by a processor to implement a desired method. Examples of memories may comprise one or more memory chips, disk drives, etc. Such memories may operate using any suitable electrical, optical, and/or magnetic mode of operation.

A "user device" may be any suitable electronic device that can process and communicate information to other electronic devices. The user device may include a processor and a computer-readable medium coupled to the processor, the computer-readable medium comprising code, executable by the processor. The user device may also each include an external communication interface for communicating with each other and other entities. Examples of user devices may include a mobile device, a laptop or desktop computer, a wearable device, etc.

"Access data" may include any suitable data that can be used to access a resource or create data that can access a resource. In some embodiments, access data may be account information for a payment account. Account information may include a PAN (primary account number), payment token, expiration date, verification values (e.g., CVV, CVV2, dCVV, dCVV2), etc. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated fuel dispensers (AFDs), automated teller machines (ATMs), virtual cash registers (VCRs), kiosks, security systems, access systems, Websites, and the like. An access device may use any suitable contact or contactless mode of operation to send or receive data from, or associated with, a mobile device.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

A "token" may be a substitute value for a credential. A token may be a string of numbers, letters, or any other suitable characters. Examples of tokens include payment tokens, access tokens, personal identification tokens, etc.

An "access token" may include an identifier for an account that is a substitute for a access data. A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token value may be generated such that the a recovery of the original access data from the token value may not be computationally derived.

A "key" may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include a cryptographic key that that forms a public key of a public/private key pair. The public key may be designed to be shared (e.g., transmitted between entities) and may be configured such that any information encrypted with the public key may only be decrypted using a private key associated with the public key. In some embodiments, a public key may be an index in a distributed ledger.

A "private key" may include a cryptographic key that forms a private key of a public/private key pair. A private key may be used to decrypt data encrypted with a public key.

A "distributed ledger" may include a database that is shared among multiple nodes across a network. Entities corresponding to each node may store identical copies of the ledger at a given time. The entities may have permission to make changes or additions to the ledger. When the ledger is changed, the participating entities may receive the updated ledger. An example of a distributed ledger can include a blockchain, wherein interactions are verified before being recorded to the blockchain in a block of transactions.

A "digital identity" (DI) may include a secure set of information about an entity (e.g., a person, organization, or thing). A DI may comprise a plurality of identity attributes, as well as an identifier of the digital identity. The identity attributes may be pieces of information about the entity. For example, a DI for a user Joe Smith may include identity attributes such as the user's date of birth, social security number, address, and driver's license number, as well as an identifier such as Joe_Smith_1234 which is used to identify Joe Smith's digital identity. The DI may be made available to another entity in a secure manner. DIs may rely on agreements among stakeholders and security measures such as cryptography.

An "assertion" may include a secure fact about an entity. For example, an assertion may specify something about an entity, such as whether the entity has the attributes required to rent a car. For example, an assertion about the entity in this context may be "this user is over 25 years old." An assertion may be based on one or more identity attributes, or pieces of information about the entity. An assertion may be secured cryptographically. An assertion may be digitally signed by the entity of interest and/or the trusted party providing the secure facts.

An "account assertion" may be an assertion about an account of an entity. The account assertion may be based on account data of the entity and/or a token related to account data. The account assertion may be related to, for example, a type of account, an account balance, account standing, etc. For example, an account assertion about a payment account may be "this user has a payment account with at least $20." Another example of an account assertion may be "this user has a valid transit account."

An "assertions model" may be a set of assertions. The assertions model may be predetermined and may depend on the entity that is requesting the assertions, or the type of entity that is requesting the assertions. For example, an assertions model for car rental agencies may comprise assertions that an entity has a valid driver's license, that the entity is of legal age to rent a vehicle, and that the entity has a valid account with an issuer. Assertions models may also be specific to the entity requesting the assertions. For example, an assertions model for an entity that controls a secure building may comprise assertions that an entity has the attributes required to have authorization to enter the secure building. Assertions models may be used to prevent an entity from learning more information than is desired about another entity, specifically to prevent unauthorized profiling.

A "token service system" can include a system that services tokens. In some embodiments, a token service system can facilitate requesting, determining (e.g., generating) and/or issuing tokens, as well as maintaining an established mapping of tokens to access data in a repository (e.g. token vault). In some embodiments, the token service system may establish a token assurance level for a given token to indicate the confidence level of the token to access data binding. The token service system may include or be in communication with a token vault where the generated tokens are stored. The token service system may support token processing of transactions submitted using tokens by detokenizing the tokens to obtain the actual access data. In some embodiments, a token service system may include a tokenization computer alone, or in combination with other computers such as a transaction processing network computer. Various entities of a tokenization ecosystem may assume the roles of the token service provider. For example, processing networks and issuers or their agents may become the token service provider by implementing the token services.

FIG. 1 shows a block diagram of a system 100 that may be used in embodiments. The system 100 may comprise a user device 110, a resource provider computer 120, an assertions model manager 130 with an event log 135, a token service computer 140, a digital identity (DI) provider 150 with a DI database 155, a transport computer 160, a processing network 170, and an account provider computer 180. Any of the devices in system 100 may be in communication via a suitable communications network.

The communications network may include one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The user device 110 may be operated by a user. The user device 110 may be, for example, a mobile phone or laptop, which can allow the user to interact with other devices of the system. The user may be associated with a digital identity, and may have a user identifier (e.g., Joe_Smith_1234 for a user "Joe Smith"). The user identifier may include data associated with a digital signature and/or cryptographic key of the user. The user device 110 may store the user identifier. The user may also be associated with one or more tokens from the token service computer 140.

The resource provider computer 120 may be operated by a resource provider that provides resources to the user in exchange for some value. In some embodiments, the resource provider may be assigned a resource provider identifier. The resource provider identifier may include data associated with a digital signature and/or cryptographic key of the resource provider. The resource provider computer 120 may communicate with the user device 110 through an access device (e.g., a point of sale terminal). In some embodiments the resource provider may be referred to as a subscriber and/or a relying entity. The resource provider computer 120 may also have, or be in communication with, a subscriber processor that can read assertions.

A DI provider 150 may provide digital identities and assertions associated with those digital identities. The DI provider 150 may have access to digital identities, including the digital identity of the user. The DI provider 150 may be have access to the digital identity via a DI database 155. The DI provider 150 may be, for example, an issuer, an acquirer, a transaction service provider, or a government agency. The DI provider 150 may be configured to create and store DIs. The DI provider may be able to store the DI, for example in a DI database 155. In some embodiments, the DI provider 150 may provide and/or generate assertions based on the identity attributes of the digital identity. In some embodiments the DI provider 150 may be referred to as a publisher. The DI provider 150 may also have, or be in communication with, a writing processor that can write assertions. The DI database 155 may be described in further detail with respect to FIG. 2. Although one DI provider 150 is illustrated for purposes of illustration, there may be many different DI providers in embodiments.

The DI provider 150 may retrieve data from another source that can be used as identity attributes. Such a primary source of information may be referred to as a reference. References are generally trusted sources of information. A reference may be a verified document (e.g., a birth certificate, driver's license, password, credit card, etc.). Alternatively, or additionally, a reference may be an entity, such as a government agency, bank, individual, etc., that can provide trusted information. In some cases, a reference may also be an account provider of an account of the user, such as account provider. In some embodiments, the DI provider 150 may establish a DI based on information gathered from one or more references. In some embodiments, the DI provider 150 may be assigned an identifier. The identifier of the DI provider may include data associated with a digital signature and/or cryptographic key of the DI provider 150.

An assertions model manager 130 can maintain and store assertions models for making assertions about digital identities. An assertions model can be standardized such that information from various DI providers 150 about digital identities can be organized into a set of assertions that is uniform regardless of the DI provider 150 or the reference. The assertions model may also be standardized to provide predetermined types of assertions regarding a digital identity to a resource provider, or type of resource provider. In some embodiments, assertions models can be stored in an assertions model database of the assertions model manager 130. In some embodiments, the assertions model manager 130 may be referred to as a market platform.

In some embodiments, the assertions model can include at least one type of assertion. For example, the assertions model can include a set of assertion types sufficient to be considered "well formed" for the relevant domain. Additionally or alternatively, the assertions model can include data associated with additional identifiers, including but not limited to a name/identifier and current version of the assertions model and the date on which the assertions model was last updated.

The assertions model manager 130 may also include or be in communication with an event log 135. The event log 135 may be a file, a collection of files, or a database for storing event data. Each event may correspond to a request for information. For example, an event may correspond to a resource provider request for user data in association with an interaction. For a particular event, the system may store event data such as the parties involved, a type of the event, a time stamp, etc. Each event may be encrypted using a set of cryptographic keys. An event may, for example, be encrypted using a cryptographic key of the user, a cryptographic key of the DI provider 150, and/or a cryptographic key of the resource provider. The event may further be encrypted with cryptographic keys assigned to other entities, such as one or more third party facilitators or technology providers (e.g., financial transaction processors).

The event log 135 may be used to access event metadata for tasks such as dispute resolution, fraud detection, and/or analysis of user behaviors. By restricting access to the cryptographic keys needed to access one or more events, the event structure helps to keep data associated with the user device 110 private. For example, a private key held by a user device 110 may be required to access event data, ensuring that event data is only available with explicit permission from the user. Access paths to the event data may be defined via a common API structure. The access paths may be established such that limited entities may access the events with limited amounts of data. The event log 135 may be stored in a database. Additionally, or alternatively, the event log may be stored in a distributed ledger, including but not limited to a blockchain.

Token service computer 140 may be a computer operated by a token service system. The token service computer 140 may provide tokens to the assertions model manager 130. The tokens may be associated with accounts of the user and may be substitutes for access data (e.g., an account identifier). The token service computer 140 may receive the access data from account provider computer 180. The tokens provided by the token service computer 140 may be encrypted. In particular, the token service computer 140 may encrypt the access data with a cryptographic key to form an access token. In some embodiments, the token service computer 140 may share the cryptographic key with the assertions model manager 130 over a secure communication channel.

The transport computer 160 may route messages between the resource provider computer 120 and the processing network 170. The transport computer 160 may route messages for value interactions, such as payment settlement. The transport computer may be operated by an acquirer of the resource provider, and may maintain an account of the resource provider. The transport computer 160 may also transfer value into an account of the resource provider.

The processing network 170 may perform value interactions. In some embodiments, the processing network 170 may be a payment processing network. The processing network 170 may receive information for value interactions from the assertions model manager 130. The processing network 170 may be in communication with the assertions model manager 130 via an API exposed by the assertions model manager 130. The API may allow the processing network 170 to send messages to the assertions model manager 130. The processing network 170 can also facilitate communication between the account provider computer 180 and the transport computer 160 when completing the value interaction.

The account provider computer 180 may be operated by an account provider that maintains an account of the user. The account provider computer 180 may also facilitate tokenization of access data associated with the account. The account provider may be, for example, an issuer, a cryptocurrency network, an automated clearing house (ACH), or a transit authority. The account provider computer 180 may also be a reference that provides information about to the user to the assertions model manager 130. In some embodiments, the account provider computer 180 may also serve as an authorizing entity computer (e.g., an issuer computer).

Figure 2:
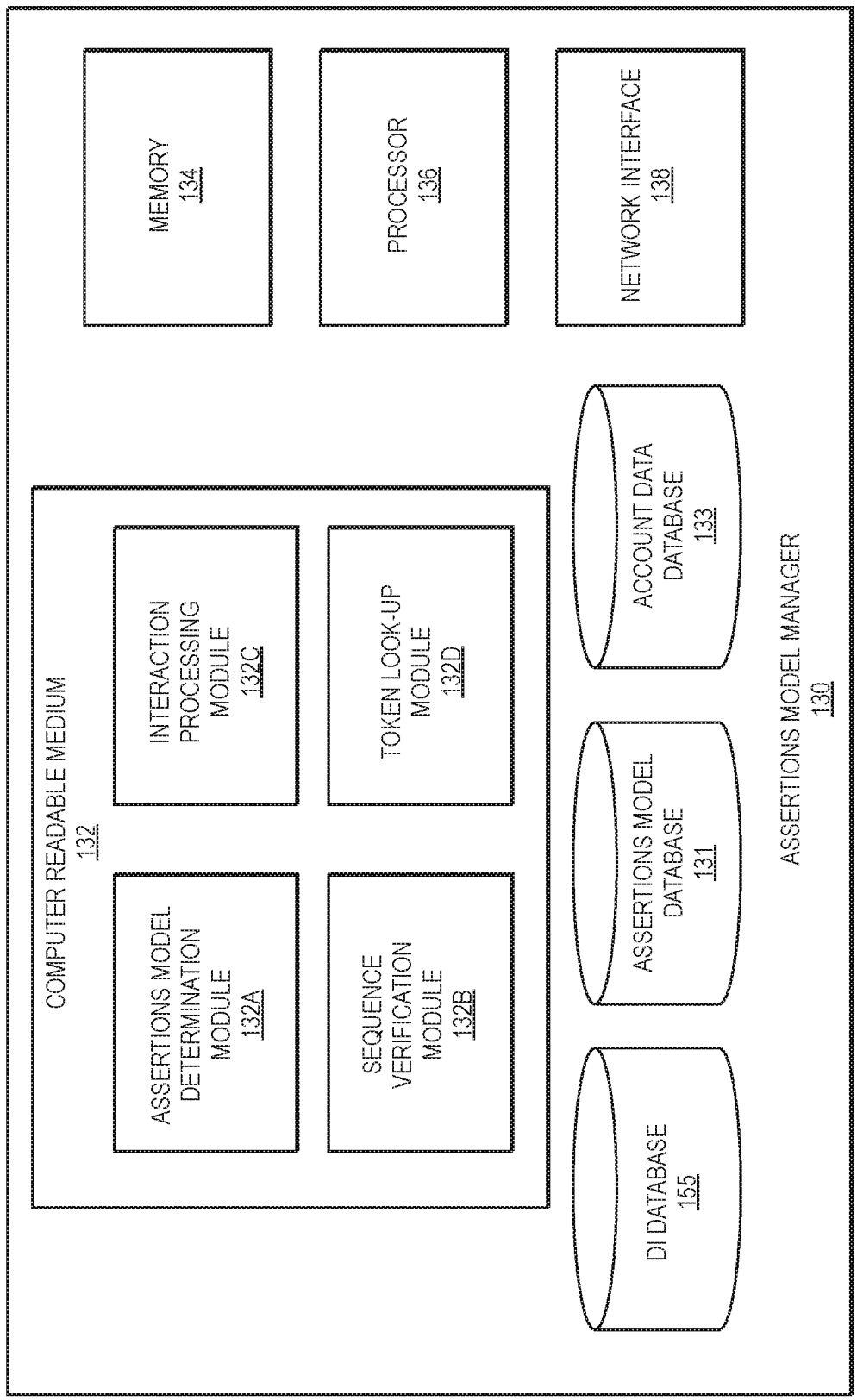
FIG. 2 shows a block diagram of an assertions model manager according to embodiments.

FIG. 2 shows a block diagram of an assertions model manager 130 according to embodiments. The assertions model manager 130 may comprise a processor 136 operatively coupled to a memory 134, a network interface 138, and a computer-readable medium 132. The computer-readable medium 132 may comprise software code stored as a series of instructions or commands. The computer-readable medium 132 may comprise an assertions model determination module 132A, a sequence verification module 132B, an interaction processing module 132C, and a token look-up module 132D. The assertions model manager 130 may further include or be in communication with an assertions model database 131, a DI database 155, and an account data database 133.

The assertions model database 131 may store assertions models and types of assertions used by the assertions model manager 130. The assertions model database may make the assertions models available based on the resource provider. For example, the assertions models database 131 may group together all assertions models and/or types of assertions available to a resource provider or type of resource provider (e.g., assertions models available to resource providers of the type "car rental"). The assertions model manager 130 may also store assertions models based on the pairwise relationship between user and resource provider. The assertions model database 131 may be a storage unit and/or device (e.g., a file system, database, collection of tables, or other storage mechanism) for storing data. The assertions model database 131 may include multiple different storage units and/or devices.

The DI database 155 may store information about digital identities. The DI database 155 may also be part of the DI provider. The DI database 155 may store identifiers of the DIs and identity attributes of users associated with the DIs. In some embodiments the DI database 155 may also store assertions about the DIs. The assertions model manager 130 may be able to use a user identifier an identifier of a DI to retrieve an associated DI from the DI database 155.

The account data database 133 may store information about accounts associated with the digital identities. For example, the account data database may store an account number, account provider identifier, account balance, and account type. The account information may come from a plurality of account providers. In some embodiments, the account data database 133 may be part of an assertions database. Some assertions may have information about accounts associated with the digital identity. Therefore, the subset of assertions in an assertions database may comprise the account data database 133. The account data database 133 may also store access tokens for accounts associated with digital identities.

The network interface 138 may be configured to connect to one or more communication networks to allow the assertions model manager 130 to communicate with other entities such as the DI provider 150, the resource provider computer 120, the user device 110, etc. For example, communication with the DI provider 150 can be direct, indirect, and/or via an API.

The processor 136 may be implemented as one or more integrated circuits (e.g., one or more single core or multicore microprocessors and/or microcontrollers). The processor 136 may be used to control the operation of the assertions model manager 130. The processor 136 can execute a variety of programs in response to program code or computer-readable code stored in memory 134. The processor 136 may include functionality to maintain multiple concurrently executing programs or processes.

The memory 134 may be implemented using any combination of any number of non-volatile memories (e.g., flash memory) and volatile memories (e.g., DRAM, SRAM), or any other non-transitory storage medium, or a combination of media.

The computer-readable medium 132 may comprise one or more non-transitory media for storage and/or transmission. Suitable media include, as examples, a random access memory (RAM), a read only memory (ROM), a magnetic medium such as a hard-drive, or an optical medium such as a compact disk (CD) or DVD (digital versatile disk), flash memory, and the like. The computer-readable medium 132 may be any combination of such storage or transmission devices.

The computer-readable medium 132 may comprise code, executable by the processor 136, for implementing a method including receiving a first request from a resource provider computer 120 for a plurality of assertions including an account assertion, related to a digital identity of a user. The method then includes responding to the first request with a response message, comprising a plurality of assertions, wherein one of the plurality of assertions is an account assertion. Then the method includes receiving a second request from the resource provider computer 120 for a value interaction from the user and initiating the value interaction.

Assertions model determination module 132A, in conjunction with the processor 136, may determine an assertions model in response to a request for assertions. The assertions model determination module 132A may receive an assertions request message, which may include a user identifier, a resource provider identifier, and interaction data such as an interaction value and an interaction type (e.g., "hotel reservation", "alcohol purchase"). The assertions model determination module 132A, in conjunction with the processor 136, can use the resource provider identifier and the interaction data to determine an assertions model. The assertions model determination module 132A, in conjunction with the processor 136, may use the assertions model database 131 to determine an appropriate assertions model. The assertions model determination module 132A, in conjunction with the processor 136, may determine the appropriate assertions model for the resource provider and determine the assertions for the assertions model based on the user. The assertions model determination module 132A, in conjunction with the processor 136, may also determine account assertions based on account data and/or tokens of the user. In some embodiments, the assertions model determination module 132A, in conjunction with the processor 136, may determine an account assertion based on a plurality of accounts of the user. Different resource providers may require a different set of assertions, depending on the pairwise relationship between the user and the resource provider.

Sequence verification module 132B, in conjunction with the processor 136, may verify a sequence number, such as one received in a value interaction request message. When a value interaction request message is received with a sequence number, the sequence verification module 132B, in conjunction with the processor 136, can verify that there is an assertions request message with the same sequence number. The sequence verification module 132B, in conjunction with the processor 136, can also verify that other information in the value interaction request message (e.g., a user identifier, a resource provider identifier, interaction data) matches information in the assertions request message. The sequence verification module 132B, in conjunction with the processor 136, may maintain a record of sequence numbers and events associated with the sequence numbers. In some embodiments, the sequence numbers may be stored in the event log 135. The sequence number may be a universally unique identifier (UUID). The sequence verification module 132B, in conjunction with the processor 136, can also assign sequence numbers to assertions request messages.

Interaction processing module 132C, in conjunction with the processor 136, may process interactions between a user and a resource provider. The interaction processing module 132C, in conjunction with the processor 136, may receive a value interaction request message from a resource provider computer and generate a value interaction message using information in the value interaction request message (e.g., a user identifier, a resource provider identifier, interaction data). In some embodiments, the value interaction message may be a payment message or transaction settlement message. The value interaction message may be generated on behalf of the resource provider computer. The value interaction message may also include a token of the user, or access data associated with the token. In some embodiments, the interaction processing module 132C, in conjunction with the processor 136, may generate a plurality of value interaction messages for a plurality of accounts of the user. The interaction processing module 132C, in conjunction with the processor 136, may then send the interaction value message to a processing network 170.

Token look-up module 132D, in conjunction with the processor 136, may retrieve a token of the user. The token may be stored in the assertions model manager 130, such as in an account data database 133. The token look-up module 132D, in conjunction with the processor 136, may alternatively retrieve the token from the token service computer 140. The token look-up module 132D may have a secure connection to the token service computer 140 so that the token look-up module 132D, in conjunction with the processor 136, can retrieve the token without sending a token request message. The token look-up module 132D may also store information (e.g., a cryptographic key) for detokenizing and/or decrypting tokens from the token service computer 140.

Figure 3:
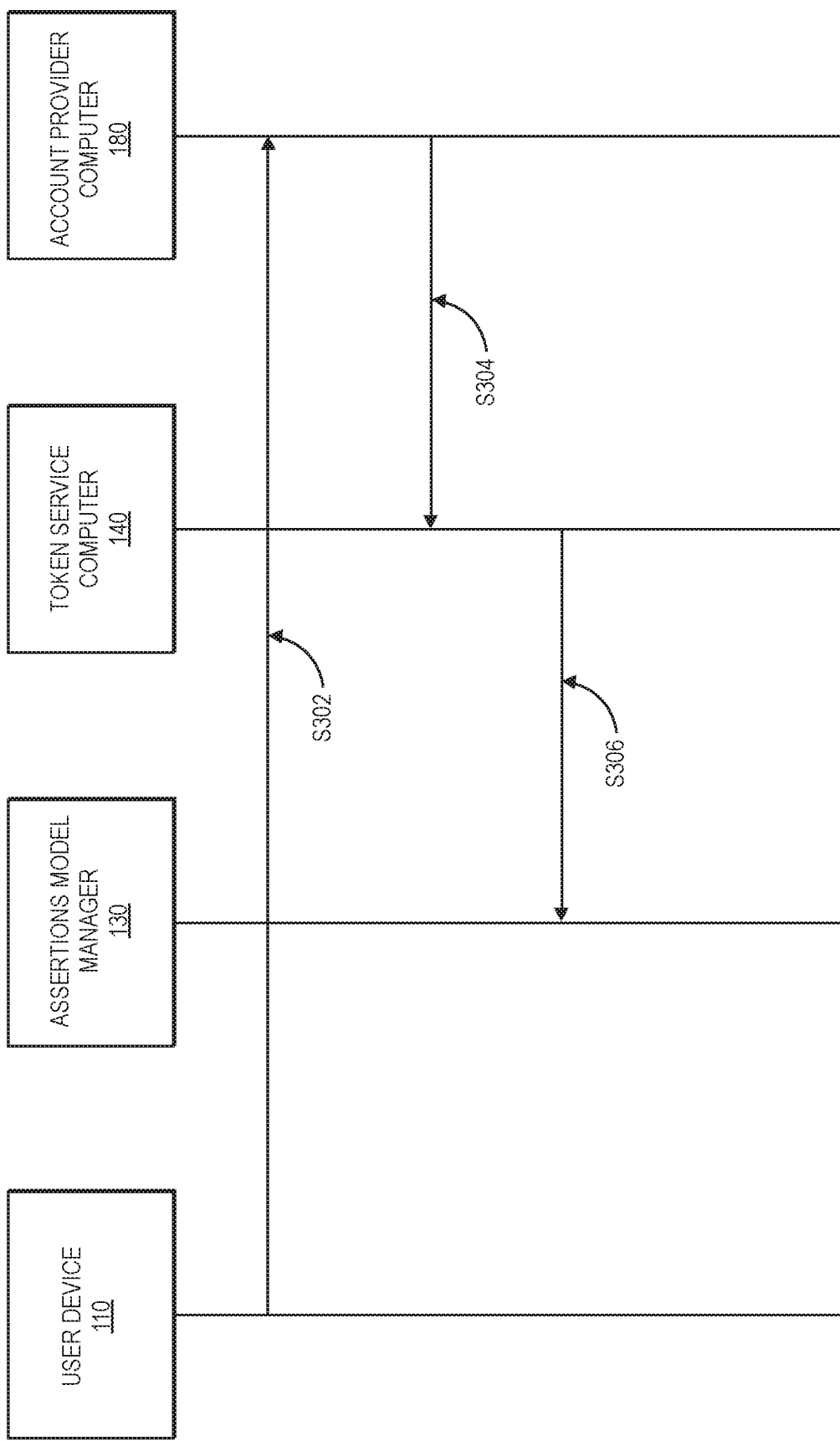
FIG. 3 shows a swim lane diagram of token registration according to embodiments.

FIG. 3 is a swim lane diagram of a token registration process according to embodiments. A user operating a user device 110 may have a digital identity with a DI provider, such as a government agency. The user may also have an account with an account provider (e.g., a payment account, a cryptocurrency wallet, a transit account). In some embodiments, the account provider may be an issuer.

In step S302, the user device 110 may initiate a token registration process with the account provider computer 180. The user device 110 can request a token from the token service system through the issuer. In requesting the token, the user device 110 may send a user identifier (e.g., a public key of the user) and/or an account identifier (e.g., an account number) to the account provider computer 180. The account provider may use the user identifier and/or the account identifier to retrieve access data (e.g., a PAN, a cryptocurrency wallet key) for the account of the user. Additionally, or alternatively, the user device 110 may send an identifier of the DI to the account provider computer 180.

In step S304, the account provider computer 180 can send a token request message to a token service computer 140. The token request message can comprise the user identifier and access data about the user's account (e.g., a PAN, an account number). In some embodiments, the account provider computer 180 may also send other information about the account of the user such as an account limit, an account balance, and restrictions on usage of the account. The token service computer 140 can then generate a token for the user account. The token may be an access token, and may in particular be a payment token. In some embodiments, the token may be generated by encrypting the access data with a cryptographic key.

In step S306, the token service computer 140 can send the user identifier and an indication of the token to the assertions model manager 130. Additionally, or alternatively, the token service computer 140 may send the token to the assertions model manager 130. In some embodiments, the token service computer 140 may send a cryptographic key to the assertions model manager 130 that can be used to decrypt and/or detokenize the token. The token service computer 140 may also send other information about the account of the user (e.g., an account limit, an account balance, restrictions on usage of the account). In some embodiments, the indication of the token may be sent to the assertions model manager 130 by the account provider computer 180. The account provider computer 180 may also send the other information about the account of the user to the assertions model manager 130. The assertions model manager 130 may then store the indication of the token, and the other information about the account of the user, in an account data database. The assertions model manager 130 may also store the access token, if the access token was received from the token service computer 140.

In some embodiments, the user may register multiple accounts. The accounts may be with the same account provider or with different account providers. When adding more than one account (e.g., when adding a second account), the user may be able to determine preferences for how the multiple accounts should be managed. These preferences may be in addition to restrictions put in place by the account provider. For example, the user may be able to designate one account as a primary account and/or establish a preferred order for using accounts. As another example, the user may select that they wish to use a second account instead of a primary account when the primary account reaches 75% of its limit.

In some embodiments, the user may have tokens established with the token service system before creating a digital identity. Then, when the user creates a digital identity with a DI provider, the user may have the option of adding tokens or other access data as identity attributes for the digital identity. Alternatively, the token and/or access data may automatically be added by the account provider and/or token service system.

Figure 4:
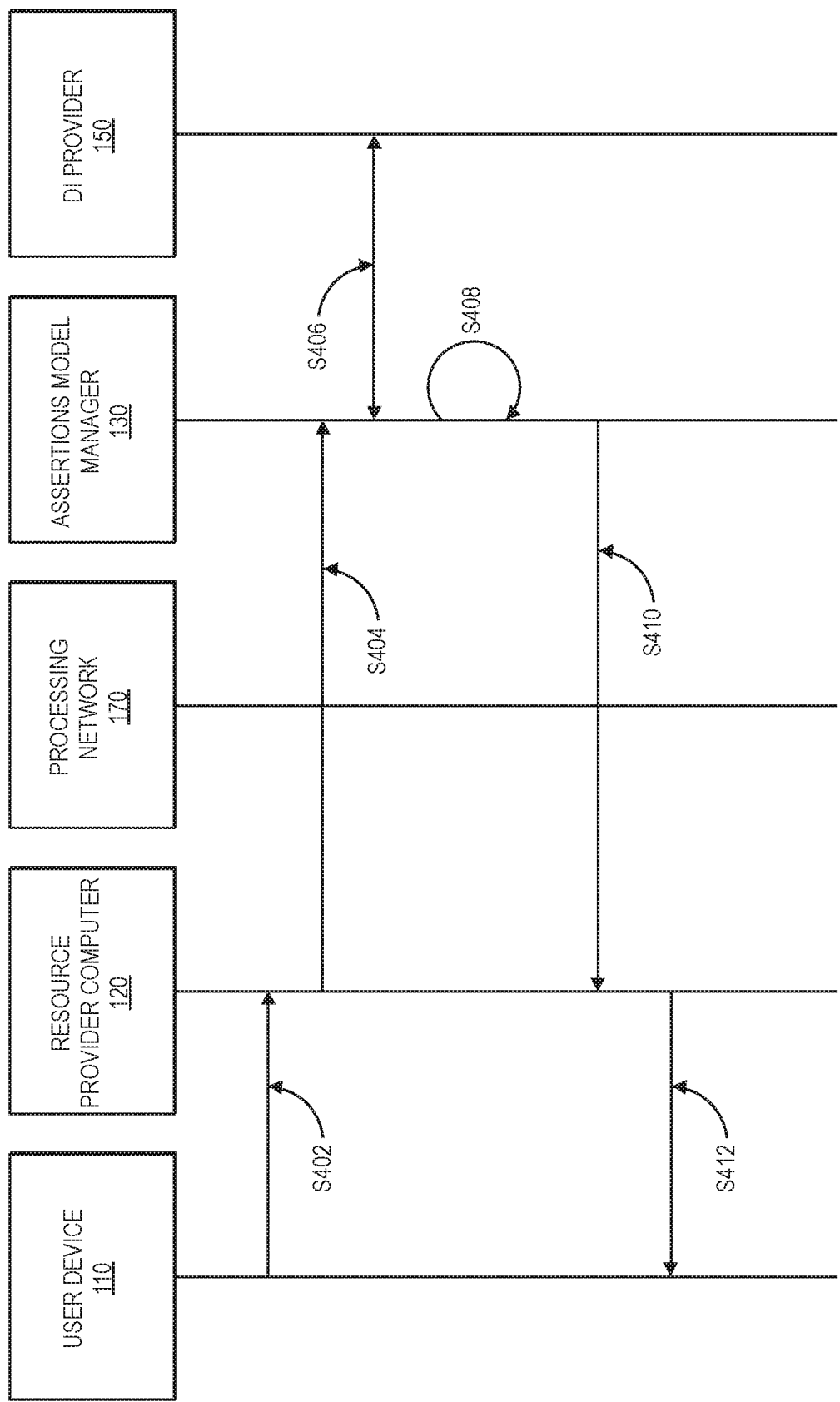
FIG. 4 shows a swim lane diagram of an assertions request according to embodiments.

FIG. 4 is a swim lane diagram of an assertions request for an interaction between a user and a resource provider.

In step S402, the user may use the user device 110 initiate an interaction with the resource provider computer 120. For example, the resource provider may be a bar and the user may initiate an interaction to purchase a drink. In initiating the interaction, the user device 110 may provide a user identifier (e.g., a public key of the user) to the resource provider computer 120 through an access device (e.g., a POS terminal). Additionally, or alternatively, the user device 110 may provider an identifier of the DI. For example, the resource provider computer 120 may use the access device to scan a QR code displayed on the user device 110 that encodes the user identifier. As another example, the user device 110 may be a laptop and the user identifier may be sent to the resource provider computer 120 as part of a request for access to digital media held by the resource provider computer 120.

In step S404, the resource provider computer 120 may send an assertions request message to an assertions model manager 130. The assertions request message may be for a plurality of assertions related to the digital identity of the user, including a request for an account assertion. The account assertion may indicate to the resource provider that the user has a valid account with which to complete the interaction. The assertions request message may be sent to the assertions model manager 130 via a processing network 170. The assertions request message may comprise the user identifier and a resource provider identifier (e.g., a public key of the resource provider), in addition to interaction data. Interaction data may include an interaction value, a time stamp, an interaction type, etc.

In step S406, the assertions model manager 130 may retrieve the digital identity of the user from a DI provider 150. The assertions model manager 130 may send the user identifier to the DI provider 150. The assertions model manager 130 may additionally, or alternatively, send an identifier of the DI to the DI provider 150. The DI provider 150 may use the user identifier to perform a search of the DI database for the corresponding DI. The DI provider 150 may then retrieve the corresponding DI. For example, the DI provider 150 may find the DI that corresponds to a public key of the user. The DI provider 150 may then send a DI associated with the identifier of the user to the assertions model manager 130.

In step S408, the assertions model manager 130 can determine an assertions model for the interaction based on the resource provider identifier and the digital identity, in addition to other interaction data. For example, the assertions model may depend on the interaction value or interaction type (e.g., data access, alcohol purchase, hotel reservation). The assertions model manager 130 may determine a set of assertions, such as by querying an assertions database. One or more of the assertions in the set of assertions may be an account assertion. The assertions model manager 130 may also use the resource provider identifier to determine a resource provider type. The resource provider type may be used to determine an assertions model. For example, Joe's Liquor may have a resource provider identifier "JOESL", and the resource provider type may be "liquor store". An assertions model may be determined based on the resource provider type of "liquor store." The assertions model manager 130 can also generate a sequence number for the assertions request message. For example, the sequence number may be generated using UUID (universally unique identifier) standards. The sequence number may then be stored with information about the assertions request message (e.g., user identifier, resource provider identifier, interaction data) in an event log, such as event log 135 of FIG. 1.

In determining an assertions model, the assertions model manager 130 may determine an account of the user. The assertions model manager 130 may query an account data database to determine an account of the user. The assertions model manager 130 may determine that an account exists for the user, for example, by determining an access token for the account of the user. The assertions model manager 130 may additionally determine other information such as an account balance, an account limit, and an account standing (e.g., that the account is not delinquent). The assertions model manager 130 may then determine an account assertion based on the account of the user. For example, an account assertion may state that the user has a valid payment account with a bank and that the account has at least a balance of $25. The account assertion may be based on the access token of the user or an indication of the access token.

In some embodiments, an assertions model may be tailored to one or more types of recourse providers or domains (e.g., there may be an assertions model for ecommerce, an assertions model for government entities, an assertions model for bars, an assertions model for rental car companies, etc.). As an example, an assertions model for the type of resource provider "liquor store" may include two types of assertions: (1) whether the user is 21 or older and (2) whether the user has access to at least $5 in a payment account. Alternatively, or additionally, an assertions model may be tailored to a specific resource provider (e.g. a particular store, the DMV, a particular restaurant, etc.). As an example, an assertions model for Joe's Liquor may include two types of assertions: (1) whether the user is 21 or older and (2) whether the user has at least $50 in a payment account. Additionally or alternatively, assertions models may vary according to the user and/or DI provider.

As a more specific illustration, the user may be named "Bob Smith" may have a digital identity which has a digital identity identifier such as "Bob_Smith_1234" and that includes attributes including an age of 26 years old, and a token for a checking account with $1000 in it. The actual assertion model that is created may include two assertions: 1) Bob_Smith_1234 is over 21 years old and 2) Bob_Smith_1234 has over $50 in a payment account.

In some embodiments, when the assertions model manager 130 is determining an account assertion, it can use the interaction value to determine if there is enough in the account to complete the interaction or to reach some minimum value. If the assertions model manager 130 determines that one account of the user is not sufficient (e.g., the account has $100 but the value of the interaction is $200), the assertions model manager 130 may determine if the user has multiple accounts that can be used. For example, the assertions model manager 130 may determine that there is an account token for a second account of the user, and the combined value of the first account and the second account is at least the value of the transaction. The assertions model manager 130 may then determine an account assertion based on a plurality of accounts of the user. For example, if a combination of the plurality of accounts has a value of at least $200, the account assertion may state "the user has at least the $200 in one or more accounts", without stating that multiple accounts may be used.

In step S410, the assertions model manager 130 may send a response message to the resource provider computer 120 with the plurality of assertions, including the account assertion, and the sequence number. The resource provider may then consider the interaction to be authorized.

In step S412, after the resource provider computer 120 receives the assertions, the resource provider computer 120 may complete the interaction. The resource provider can then provide resources to the user. For example, the resource provider may give the user goods or allow the user access to data. At this point, the user may not have paid or provided any value for the resource from the resource provider. The resource provider computer 120 may store the sequence number.

Figure 5:
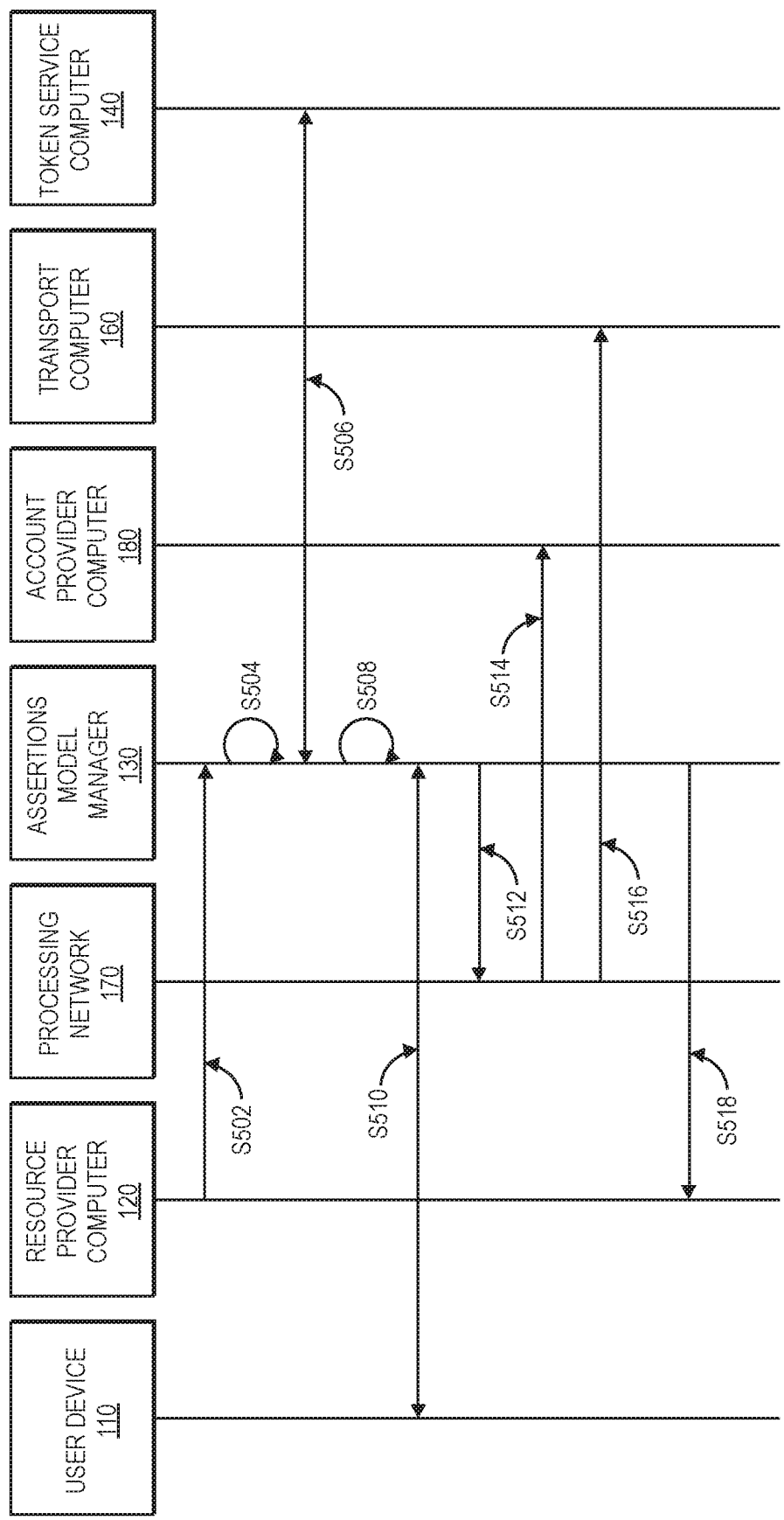
FIG. 5 shows a swim lane diagram of a value interaction according to embodiments.

FIG. 5 shows subsequent processing of a value interaction. This may be done immediately after the response message with the set of assertions is received by the resource provider computer. Alternatively, the value interaction may be processed some time later, such as at the end of the day. The user may have had additional interactions with the resource provider since the assertions request message. These additional interactions may or may not have involved additional assertions request messages. For example, the user may have added items to a bar tab or may have accrued charges on a hotel bill. Additional interactions that require new information about the user (e.g., adding an age-restricted good such as alcohol) or that significantly increase the interaction value may be examples of interactions that involve additional assertions request messages.

In step S502, the resource provider computer 120 can send a value interaction request message to the assertions model manager 130. The value interaction request message may be to request the interaction value from the user. The value interaction request message may be sent to the assertions model manager 130 via a processing network 170. In some embodiments, the value interaction may be a transaction settlement or a payment request. The value interaction request message may comprise the resource provider identifier, the user identifier, interaction data (including the interaction value), and the sequence number from the previous assertions request message. The interaction value in the value interaction request message may be more or less than the interaction value from the assertions request message. For example, the user may have added more items to a food bill and increased the interaction value. If the value interaction is associated with multiple interactions with the user that required assertions request messages, the value interaction request message may comprise a sequence number for each assertions request message.

In step S504, the assertions model manager 130 may use the sequence number to verify the value interaction request message. First the assertions model manager 130 may search for the sequence number in an event log and retrieve information about the assertions request message associated with the sequence number (e.g., user identifier, resource provider identifier, and/or other interaction data). The assertions model manager 130 can also verify that the user identifier, resource provider identifier, and/or other interaction data match those from the assertions request message. The assertions model manager 130 may also determine if the sequence number has already been used in a value interaction or value interaction request message. If the sequence number is not associated with a assertions request message, this may indicate that the sequence number is fraudulent. If the sequence number has already been used in a previous value interaction, this may indicate that the user is being double charged for an interaction. This may protect against the resource provider computer 120 submitting fraudulent value interaction requests with the user identifier.

In step S506, the assertions model manager 130 may retrieve the token of the user. The assertions model manager 130 may, for example, use the user identifier to request the access token associated with an account of the user from the token service computer 140. Alternatively, the assertions model manager 130 may retrieve the token from the account data database. If the assertions model manager 130 previously determined that a plurality of accounts of the user were needed to complete the interaction (e.g., as in S408 of FIG. 4) the assertions model manager 130 may retrieve a token for each account that will be used. In some embodiments, the assertions model manager 130 may use a cryptographic key from the token service computer 140 to decrypt and/or detokenize the token and recover the associated access data (e.g., a PAN). In other embodiments, the assertions model manager 130 may communicate with the token service computer 140 to detokenize the token.

In step S508, the assertions model manager 130 can initiate a value interaction. In initiating the value interaction, the assertions model manager 130 may generate a value interaction message. The value interaction message may comprise the resource provider identifier, access data from the token of the user, the interaction value, and other interaction data. The value interaction message may also comprise the sequence number. The value interaction message may be generated on behalf of the resource provider computer 120. In some embodiments, the value interaction message may be a transaction settlement message.

In some embodiments, if the assertions model manager 130 previously determined that a plurality of accounts of the user were needed to complete the interaction, the assertions model manager 130 may distribute the value interaction between the plurality of accounts of the user and generate a plurality of value interaction messages. The assertions model manager 130 may generate a value interaction message for each account of the user that is to be used. For example, the user may attempt to complete an interaction with a value of $1000. A primary account of the user may have a limit of $750, but the user may have a second account that can provide the remaining $250. Then, when the assertions model manager 130 is generating the value interaction messages, it can generate a first value interaction message for the primary account with a partial interaction value of $750, and a second value interaction message for the second account with a partial interaction value of $250. In other embodiments, the assertions model manager 130 may distribute the value interaction between the plurality of accounts of the user based on preferences indicated by the user during registration. For example, the user may have indicated that they wish to use a second account to complete a value interaction when the primary account reaches 75% of its limit.

In step S510, the assertions model manager 130 can optionally request approval from the user before completing the value interaction. The assertions model manager 130 may send an approval request message to the user device 110. If the value interaction message has already been sent to another entity (e.g., to a processing network, an account provider computer) the approval request message may be sent by that entity. The approval request message may comprise the resource provider identifier, a time stamp for the interaction, an interaction value (or partial interaction value), and the account (or accounts) that will be used. For example, the request may ask "Do you approve a $35 charge from Jeff's Pizza from your Wells Fargo account?" In some embodiments, the user may need to authenticate themselves before approving the interaction. For example, the user may need to enter a password in the user device 110 prior to responding to the approval request message. If the user does not respond or denies the approval request, the assertions model manager may cancel the value interaction. If the user is unable to access the user device 110, the user may be able to access to a portal using a different device (e.g., by accessing a website of the assertions model manager using a laptop) and see pending charges to approve.

In step S512, the assertions model manager 130 may transmit the value interaction message or messages to the processing network 170. The processing network 170 may be a payment processing network. The processing network 170 may identify the account providers involved in the value interaction (e.g., using an account identifier or token associated with the account identifier). In some embodiments, the processing network 170 may include a table mapping account identifiers or tokens to account providers. The processing network 170 may also identify a transport computer associated with the resource provider.

In step S514, the processing network 170 can send the value interaction message to the account provider computer 180. If the interaction is being split between a plurality of accounts of the user, the processing network 170 may send a value interaction message to each of the account provider computers 180. Each account provider computer 180 may then subtract the interaction value, or partial interaction value from the associated account of the user. In some embodiments, the processing network 170 may send an AFT (account funding transaction) message. An AFT is a transaction designed to debit an account. The account provider computer 180 may also store the sequence number from the value interaction message. The sequence number may be used by the account provider to later reference the value interaction (e.g., in the case of a dispute).

In step S516, the processing network 170 can send the value interaction message, or messages, to a transport computer 160 (e.g., a transport computer operated by an acquirer of the resource provider). The transport computer 160 can initiate adding the interaction value to an account of the resource provider. The transport computer 160 may also store the sequence number from the value interaction message. The sequence number may be used by the transport computer 160 to later reference the value interaction (e.g., in the case of a dispute). In some embodiments, the processing network 170 may send an OCT (original credit transaction) message. An OCT (Original Credit Transaction) can be used to deliver funds to the resource provider account. It is separate from, and takes place after, the AFT transaction. This timing is to ensure that funds are secured before they are sent to the recipient.

In step S518, the resource provider computer 120 can receive a notification that the value interaction has been completed. In some embodiments, the notification may come from the assertions model manager 130. In other embodiments, the notification may come from the transport computer 160 after receiving the value interaction message from the processing network 170.

In some embodiments, interactions may be authorized by the assertions model manager instead of an authorizing entity such as an issuer. This may be done with stand-in processing. It may be that the assertions model manager authorizes an interaction that the authorizing entity would not have. To address this, when processing an interaction, the assertions model manager may also calculate a risk score for the interaction. The risk score may then be used to calculate a price for the interaction and offer it on a risk marketplace. This can allow other entities to assume the risk of an interaction instead of the authorizing entity.

Embodiments can provide a number of advantages. An assertions model manager can allow a large amount of information about a user to be available when making an interaction, while also keeping that information safe. Embodiments also allow the convenience of tokenized payments, while maintaining high security. The token and/or access data can remain in the possession of the token service system or the assertions model manager, and they can communicate over secured channels. The information can thus be kept out of the possession of the user or the resource provider, which are likely less secure than other entities in the system. Additionally, the assertions model manager may be better situated to authorize interactions than other authorizing entities. It can have access to more aggregate data about the user, the resource provider, and other interactions. The assertions model manager also has access to multiple accounts of the user, which may be in disparate systems (e.g., a cryptocurrency account and a credit card), and can generate interactions with all of them using the same interaction processing system.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive, or an optical medium such as a CD-ROM. Any such computer-readable medium may reside on or within a single computational apparatus, and may be present on or within different computational apparatuses within a system or network.

Such programs may also be encoded and transmitted using carrier signals adapted for transmission via wired, optical, and/or wireless networks conforming to a variety of protocols, including the Internet. As such, a computer-readable medium according to an embodiment may be created using a data signal encoded with such programs. Computer-readable media encoded with the program code may be packaged with a compatible device or provided separately from other devices (e.g., via Internet download). Any such computer-readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    receiving, by an assertions model manager, a first request from a resource provider computer for a plurality of assertions, including an account assertion, related to a digital identity of a user, wherein the first request comprises a resource provider identifier for a resource provider operating the resource provider computer and a user identifier for the user;
    responding, by the assertions model manager, to the first request with a response message comprising a plurality of assertions specific to the resource provider identifier or a type of resource provider, and each assertion in the plurality of assertions is a secure fact about the user, wherein one of the plurality of assertions is an account assertion that provides information about an account of the user, but does not reveal sensitive account data about the account;
    receiving, by the assertions model manager, a second request from the resource provider computer for a value interaction from the user, the second request comprising the user identifier, the resource provider identifier, and an interaction value; and
    responsive to receiving the second request, initiating, by the assertions model manager, the value interaction for the interaction value.

2. The method of claim 1, wherein the response message contains a sequence number and the sequence number is used to verify the second request.

3. The method of claim 1, further comprising:
    requesting, by the assertions model manager, approval from the user before completing the value interaction.

4. The method of claim 1, wherein the account assertion is based on an access token of the user.

5. The method of claim 4, wherein the access token is stored at the assertions model manager.

6. The method of claim 1, wherein the user identifier is cryptographic key associated with the user.

7. The method of claim 1, wherein initiating the value interaction comprises:
    generating, by the assertions model manager, a value interaction message on behalf of the resource provider computer based on the second request and the account assertion, wherein the value interaction message comprises access data; and
    transmitting, by the assertions model manager, the value interaction message to a processing network.

8. The method of claim 1, wherein the method further comprises, after receiving the first request and before responding to the first request:
    retrieving, by the assertions model manager, the digital identity of the user from a digital identity provider;
    determining, by the assertions model manager, the account of the user; and
    determining, by the assertions model manager, an assertions model based on the resource provider identifier and the digital identity.

9. The method of claim 1, wherein the account assertion is based on a plurality of accounts of the user.

10. The method of claim 9, wherein initiating the value interaction further comprises:
    generating a plurality of value interaction messages.

11. An assertions model manager comprising:
    a processor; and
    a computer-readable medium comprising code executable by the processor to implement a method comprising:
        receiving a first request from a resource provider computer for a plurality of assertions, including an account assertion, related to a digital identity of a user, wherein the first request comprises a resource provider identifier for a resource provider operating the resource provider computer and a user identifier for the user;
        responding to the first request with a response message, comprising a plurality of assertions specific to the resource provider identifier or a type of resource provider, and each assertion in the plurality of assertions is a secure fact about the user, wherein one of the plurality of assertions is an account assertion that provides information about an account of the user, but does not reveal sensitive account data about the account;
        receiving a second request from the resource provider computer for a value interaction from the user, the second request comprising the user identifier, the resource provider identifier, and an interaction value; and
        initiating the value interaction for the interaction value.

12. The assertions model manager of claim 11, wherein the response message contains a sequence number and the sequence number is used to verify the second request.

13. The assertions model manager of claim 11, wherein the method further comprises:
    requesting approval from the user before completing the value interaction.

14. The assertions model manager of claim 11, wherein the account assertion is based on an access token of the user.

15. The assertions model manager of claim 14, wherein the access token is stored at the assertions model manager.

16. The assertions model manager of claim 11, wherein the assertions model manager includes one or more computers.

17. The assertions model manager of claim 11, wherein initiating the value interaction comprises:
   generating a value interaction message on behalf of the resource provider computer based on the second request and the account assertion, wherein the value interaction message comprises access data; and
   transmitting the value interaction message to a processing network.

18. The assertions model manager of claim 11, wherein the method further comprises, after receiving the first request and before responding to the first request:
   retrieving the digital identity of the user from a digital identity provider;
   determining the account of the user; and
   determining an assertions model based on the resource provider identifier and the digital identity.

19. The assertions model manager of claim 11, wherein the account assertion is based on a plurality of accounts of the user.

20. A method comprising:
   receiving, by a resource provider computer, a user identifier from a user initiating an interaction with a resource provider;
   sending, by the resource provider computer, a first request comprising the user identifier to an assertions model manager, wherein the first request also comprises a resource provider identifier for the resource provider operating the resource provider computer;
   receiving, by the resource provider computer from the assertions model manager, a response message comprising a plurality of assertions specific to the resource provider identifier or a type of resource provider, and each assertion in the plurality of assertions is a secure fact about the user, wherein one of the plurality of assertions is an account assertion that provides information about an account of the user, but does not reveal sensitive account data about the account;
   completing, by the resource provider computer, the interaction with the user;
   sending, by the resource provider computer, a second request for a value interaction to the assertions model manager, the second request comprising the user identifier, the resource provider identifier, and an interaction value; and
   receiving, by the resource provider computer, a notification that the value interaction has been completed for the interaction value.

\* \* \* \* \*